United States Patent [19]
Green et al.

[11] Patent Number: 4,841,121
[45] Date of Patent: Jun. 20, 1989

[54] HOT HEADING PLASTIC RIVETS BY RESISTANCE HEATING

[75] Inventors: Edward A. Green; Clayton S. Stambaugh, both of Warren, Ohio

[73] Assignee: The Taylor-Winfield Corporation, Warren, Ohio

[21] Appl. No.: 63,395

[22] Filed: Jun. 18, 1987

[51] Int. Cl.$^4$ .............................................. H05B 1/00
[52] U.S. Cl. .................................. 249/243; 156/583.7
[58] Field of Search .......................... 219/243; 29/877; 156/583.1, 583.7, 583.9, 477.1, 379.6, 379.9, 380.2, 380.4, 380.6; 412/13, 43; 228/120

[56] References Cited
U.S. PATENT DOCUMENTS

| | | | |
|---|---|---|---|
| 4,167,435 | 9/1979 | Olschewski | 219/243 X |
| 4,210,798 | 7/1980 | Ode et al. | 219/243 |
| 4,359,361 | 11/1982 | Wright | 219/243 X |
| 4,369,013 | 1/1983 | Abildgaard et al. | 412/43 X |

Primary Examiner—E. A. Goldberg
Assistant Examiner—M. M. Lateef
Attorney, Agent, or Firm—William J. Ruano

[57] ABSTRACT

Welding apparatus including a tube of high resistance material brazed between two electrical conductive tubes connected to the secondary of a resistance welding transformer. Also included is a plastic element having a head projecting through a hole of a metallic element. By initiating forcible contact between the tube and the head of the plastic element, such head is heated, softens and becomes upset to form an interlock with the metallic element.

4 Claims, 1 Drawing Sheet

HOT HEADING PLASTIC RIVETS BY RESISTANCE HEATING

This invention relates to the interconnection of plastic and metal parts by the hot heading of plastic rivets by resistance heating.

BACKGROUND OF THE INVENTION

Plastic parts have been joined to metal parts by means unsatisfactory for economical mass production for the interconnection of such parts without sticking.

SUMMARY OF THE INVENTION

In accordance with the present invention, plastic rivets may be hot headed and joined to a metal base by resistance heating provided by a welding machine.

DETAILED DESCRIPTION OF THE DRAWING

DETAILED DESCRIPTION OF THE PREFERRED EMBODIMENT

Figure 1:
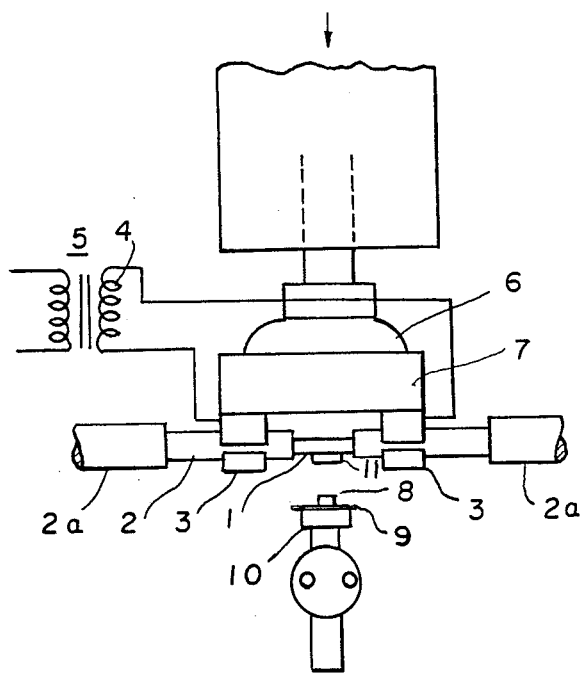
FIG. 1 is an elevational view of welding apparatus for fusing plastic for interconnection with a steel base.

Referring more particularly to FIG. 1, which shows a welder, tube 1 is hollow, such as tubular, of round or rectangular cross section and of high electrical resistance material brazed between two copper tubes 2 which are connected by clamps 3 to the secondary 4 of a resistance welding transformer 5. A welder control of any well known type (not shown) initiates the downward movement of the ram 6 moving insulating block 7 downwardly, applying force to the heating element or tube1 through its pad 11 and, in turn, to the plastic protrusion 8 or rivet having a head projected through a hole in the steel or other metallic element 9, such as a clip, which is supported by the welder anvil 10. The control also times the flow of current through the heating element 1.

Figure 2:
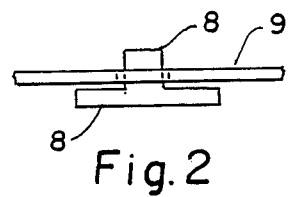
FIG. 2 is an enlarged elevation view of the plastic and steel parts to be interconnected before operation of the welding machine.
Figure 3:
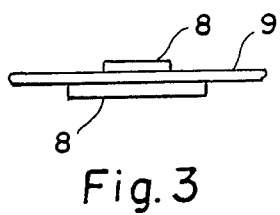
FIG. 3 is an elevational view of the steel and plastic parts (enlarged) of FIG. 2 after fusing or hot heading the plastic rivet by the welding apparatus shown in FIG. 1.

FIG. 2 shows the plastic and metal parts before fusion and FIG. 3 shows them after fusion.

It is the resistance of the heating element 1 to the flow of the current which rapidly raises the temperature of the element sufficiently to weaken the plastic rivet 8 so that it will upset under the influence of the ram force. At this point water or air is passed through hoses 2a and the tubular heating element 1 to rapidly cool it to prevent sticking of the plastic to the metallic element.

Plastic insert 8 is tightly interlocked and fastened to a steel clip 9. Heating time is approximately ⅓ second and cooling time is approximately 1 to 2 seconds.

A less desirable modification is to make tube 1 of solid instead of tubular material.

Figure 4:
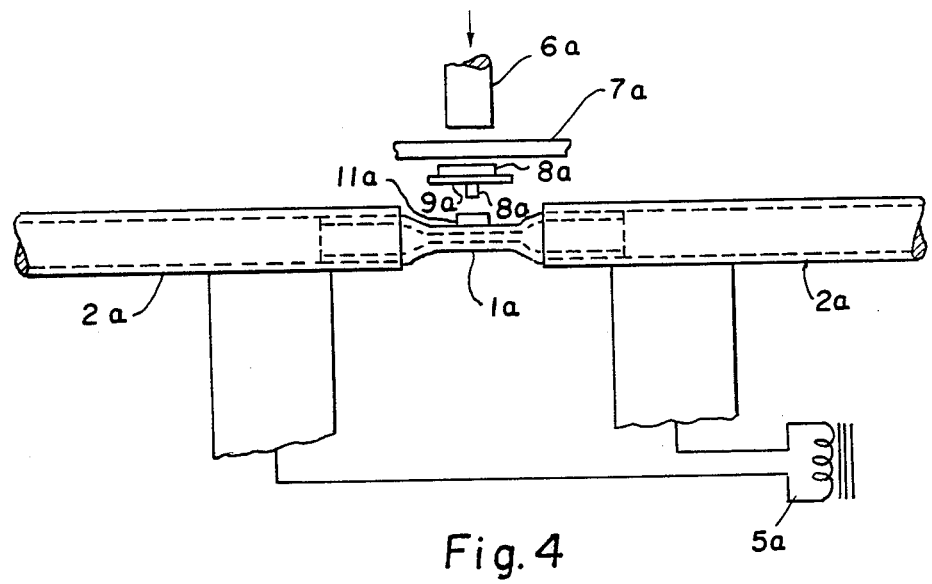
FIG. 4 is an elevation of a modification.

FIG. 4 shows a modification wherein the same parts are inverted. More specifically, the tubular resistance or heating element 1a is connected to copper tubing 2a connected to the secondary 5a of the welding transformer. Above the heating element 1a is a pad 11a which engages the head of plastic rivet 8a which becomes upset to form an interlocking head when ram 6a pushes the insulating block 7a against it.

Thus it will be seen that the present invention lends itself to economical mass production for the interconnection, without sticking, of plastic and metallic elements for a wide variety of uses, which production is much speedier than present methods.

While we have illustrated and described several embodiments of our invention, it will be understood that these are by way of illustration only and that various changes and modifications may be contemplated in invention and within the scope of the following claims:

I claim:

1. Resistance welding apparatus including at tube of high electrical resistance material brazed between two electrically conductive tubes connected to the secondary of a resistance welding transformer, a plastic element having a head projecting through a hole of a metallic element, and means for initiating forcible contact between said tube of high electrical resistance material and the head of said plastic element whereby the head of said plastic element is heated, softens and becomes upset to form an interlock, of the same material as said head, with said metallic element.

2. Resistance welding apparatus as recited in claim 1 together with means for passing cooling fluid through said tube after welding to rapidly cool said plastic element to prevent sticking onto said metallic element.

3. Welding apparatus as recited in claim 1 wherein said tube of high resistance material has a pad for engaging said head, and an anvil for supporting said metallic element for said forcible contact.

4. The method of interconnecting a plastic rivet to a metallic piece having a hole through which the shank and head of said rivet projects, comprising passing high heating welding current through a tubular element of high electrical resistance while forcibly pressing said tubular element against said heat to effect upsetting thereof and interlocking with said metallic piece and, after upsetting, passing a cooling fluid through said tubular element to rapidly cool said head and said metallic piece.

* * * * *